April 11, 1939.  A. O. COUYOUMDJIAN  2,154,324
PHOTOGRAPHIC CAMERA WITH EXPOSURE METER
Filed March 10, 1937
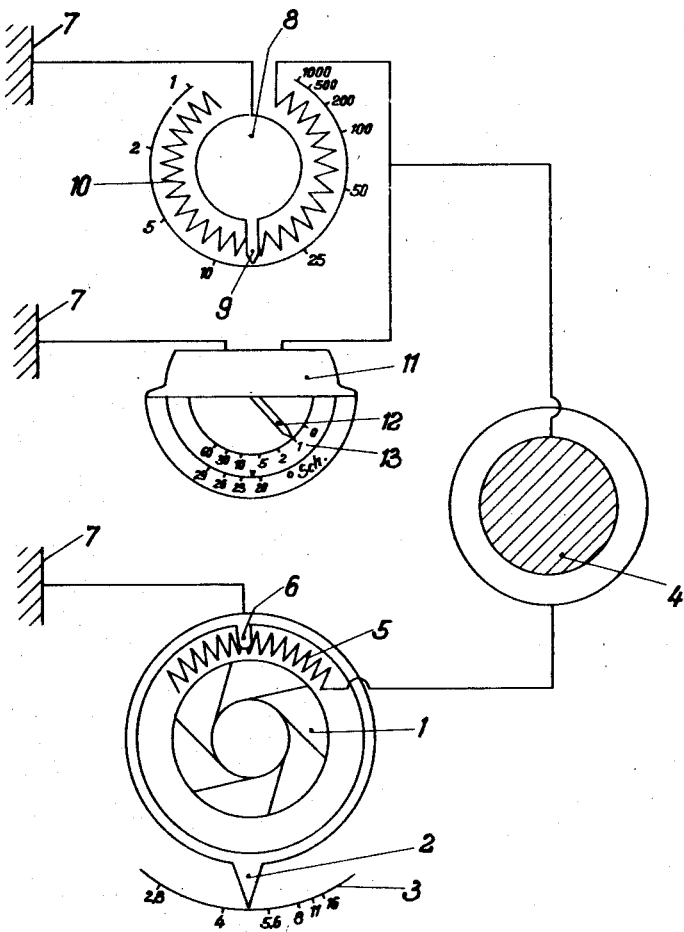
Inventor:
Agop Ohan Couyoumdjian,
Attorneys Patented Apr. 11, 1939

2,154,324

UNITED STATES PATENT OFFICE 2,154,324

PHOTOGRAPHIC CAMERA WITH EXPOSURE METER

Agop Ohan Couyoumdjian, Berlin, Germany

Application March 10, 1937, Serial No. 130,190
In Germany February 28, 1936

2 Claims. (Cl. 95—10)

My invention relates to photographic cameras provided with an electric exposure meter.

Photographic cameras in combination with electric exposure meters are already known, in which two variable resistances are connected in series with the meter and the photocell, one resistance being coupled to the diaphragm adjustment and the other to the means for setting the shutter speeds. Thus by varying the resistance according to the meter reading, the diaphragm opening and the shutter speeds are correspondingly adjusted. This arrangement has the disadvantage that, owing to both resistances being in series with the meter, the current flowing through the meter does not change proportionately to the change in value of the resistance which is being varied, but to the change in value of the sum of the resistances considered as one, so that an accurate adjustment of the diaphragm or of the shutter speeds is not possible.

An arrangement is also known consisting of a single resistance, in which the resistance itself is movable and connected to one adjustment, while its slider moves with the other adjustment. By this method the above defect is avoided, but owing to the unequal division of the diaphragm scale, a compensating gear is required between the resistance and the diaphragm. Further, when a focal plane shutter is employed, then, owing to the unequal division of the shutter-speed scale, a second compensating gear is required between the resistance and the focal plane shutter. Thirdly, owing to the distance of the diaphragm adjusting ring from the shutter-speed adjustment, a mechanical transmission gear is necessary to bridge the distance. Finally, a diaphragm for varying the aperture of the lens and built inside the lens fitting is known. When, however, it is desired to build not only the diaphragm but also the electric resistance inside the lens fitting in a dustproof design, the coupling arrangement must evidently occupy a minimum space. Up to the present, owing to the space required, firstly, for the compensating gear between the diaphragm and the resistance and, secondly, for the transmission gear between the slider and the shutter-speed adjustment, it has been found necessary to build the resistance outside the lens fitting.

All these disadvantages are avoided by the present invention, which consists of a circuit comprising essentially a photocell, an electric measuring instrument and two variable resistances, one of which is in series with and the other in parallel to the measuring instrument.

The current flowing though the electic measuring instrument varies practically proportionately to the variation of whichever resistance is adjusted, i. e. practically independently of the value of the other resistance, so that a reliable setting of the diaphragm aperture or of the shutter speed is made possible. Due to the use of two resistances which are electrically independent of each other, and the scales of which can therefore be divided proportionately to the diaphragm and shutter scales, no compensating gears are required, either between the diaphragm and the resistance coupled thereto, or between the shutter and its coupled resistance. Further, the transmission gear between the diaphragm and shutter speed adjustments can be dispensed with, since the diaphragm regulating resistance is independent of the shutter speed regulating resistance. And, finally, this simplification allows the diaphragm regulating resistance and its slider to be connected directly to the moving and stationary elements of the diaphragm inside the lens fitting, within the limited space between the lens elements.

In the accompanying drawing, 1 is the diaphragm, 2 its ring adjustment lever, moving along the scale 3. The current from a light sensitive electric cell 4 flows through the resistance 5 which is mounted on the stationary part of the diaphragm and suitably insulated therefrom. A projection 6 on the ring lever 2, sliding over the resistance 5 receives the photocell current and earths it to the body of the camera at 7. From thence the current passes through the camera body 7 to the shutter speed adjustment knob 8, whence the slider 9 carries it to the resistance 10, and so back to the other pole of the photocell 4. An electric measuring instrument 11 is shunted in parallel as shown across the resistance 10, whereby the metal casing of the instrument may form the earth terminal and be cast in one piece with the camera body. The pointer 12 moves along a scale 13 marked 0, 1, 2, 5, 10, 30 and 60, which may be itself movable relative to a scale of Scheiner degrees.

The value of resistance 5 decreases with increase of the diaphragm aperture, the value of resistance 10 increases with increasing length of exposure. The resistances are preferably so constructed that the value of the first step of resistance 5 is approximately equal to the average value of the sum of the resistance of the measuring instrument and of the photocell, while the maximum value of resistance 10 is about ten times the resistance of the measuring instrument. Both resistances may be so designed that their value by adjustment of the diaphragm and of the shutter speeds varies proportionately to these.

The working of the device is as follows:

When the photocell 4 is exposed to strong light, let the current flowing through the measuring instrument 11, bring the pointer 12 to 0 on the scale 13. If the diaphragm be on f1:2.8 and the shutter speed on 1/25 sec., then in order to obtain the correct exposure, the knob 8 may be turned in counterclockwise direction, reducing the value of resistance 10 which thus takes an ever larger portion of the current of the photocell, whereby the current flowing through the measuring instrument is reduced till the pointer comes to rest at the point "1". The shutter speed thus arrived at, e. g. 1/100 sec. is then the correct exposure for the given light value and given diaphragm aperture. If now the diaphragm aperture is reduced, e. g. to f1:9, then resistance 5 will be correspondingly increased and the current of the light sensitive cell correspondingly decreased, so that the pointer of the measuring instrument moves, e. g. to the point "10" of the scale. In order to bring the pointer back to point "1" of the scale, the resistance 10 must be increased through rotation of the knob 8, in order to increase the current flowing through the electric measuring instrument 11. This automatically sets the new shutter speed, e. g. on 1/10 sec., whereby the effect of the diminished aperture is compensated for.

If with the shutter set to its longest adjustment of 1 sec. the pointer of the measuring instrument does not come to "1" but stands e. g. on "10", this indicates that an exposure of 10 secs. will be necessary under the given light conditions prevailing and with the aperture used.

What I claim is:

1. A photographic camera provided with an exposure meter comprising a photoelectric cell, and a circuit connected to said cell, said circuit having a first variable resistance in series with said cell and a circuit portion in series with said first resistance and cell, said circuit portion consisting of two parts connected in parallel, one of said parallel parts being of substantially constant resistance and containing a measuring instrument, and a second variable resistance in the other part, one of said variable resistances being coupled to the means for adjusting the diaphragm of the camera and the other being coupled to the means for setting the speed of the shutter.

2. A photographic camera provided with an exposure meter comprising a photoelectric cell, two variable resistances each comprising two elements, a resistance and a contact, means mounting one of said elements of each resistance for movement with respect to the other, a measuring instrument, and a circuit connecting one element of one of said resistances to one side of said cell, one element of the second resistance and one side of said measuring instrument in parallel to the other side of said cell, and the second element of the second resistance and the other side of said measuring instrument in parallel to the second element of the first resistance, one of said variable resistances being coupled to the means for adjusting the diaphragm of the camera and the other being coupled to the means for setting the speed of the shutter.

AGOP OHAN COUYOUMDJIAN.